United States Patent

Canterino

[15] 3,658,491

[45] Apr. 25, 1972

[54] INCREASING VISCOSITY OF NORMALLY LIQUID HYDROCARBONS AND GELS PRODUCED

[72] Inventor: Peter J. Canterino, Bartlesville, Okla.

[73] Assignee: Phillips Petroleum Company

[22] Filed: June 20, 1955

[21] Appl. No.: 516,780

[52] U.S. Cl. ................................44/7 D, 44/7 E, 252/316
[51] Int. Cl. .........................................................C10l 7/02
[58] Field of Search.................44/7, 7 D, 7 E; 252/316, 9.13

[56] References Cited

UNITED STATES PATENTS

| | | | |
|---|---|---|---|
| 2,504,779 | 4/1950 | Young et al. | 44/7 X |
| 2,553,568 | 5/1951 | Finkelstein | 44/7 |
| 2,604,453 | 7/1952 | Popkin | 44/7 X |
| 2,610,114 | 9/1952 | Fischer et al. | 44/7 |
| 2,619,445 | 11/1952 | Kalafus | 260/45.5 |

Primary Examiner—Benjamin R. Padgett
Attorney—Quigg & OBeshin

EXEMPLARY CLAIM

1. The production of a gel which comprises incorporating into a normally liquid hydrocarbon a small proportion effective to form a gel of at least one liquid hydrocarbon dispersible copolymer selected from the group consisting of rubbery and solid copolymers of a compound represented by the formula $$H_2C=\underset{\underset{R}{|}}{C}-R'$$

wherein R is selected from the group consisting of hydrogen alkyl and alkoxy; and R' is selected from the group consisting of $$-\underset{\underset{X}{|}}{C}=\underset{\underset{H}{|}}{C}-Y \text{ and } -\overset{\overset{O}{\|}}{C}-OR''$$

wherein X is selected from the group consisting of hydrogen, alkyl and a halogen, Y is selected from the group consisting of hydrogen, alkyl and aryl; wherein R'' is selected from the group consisting of alkyl, cycloalkyl, aryl, alkaryl, and aralkyl; the total of the carbon atoms in R and R' when R' does not contain R'' is two to eight; and wherein when R'' is present the total of the carbon atoms in R and R' is two to thirteen and a copolymerizable compound containing a basic tertiary amine group selected from the group consisting of vinylpyridines, vinylquinolines and their nuclear-alkyl-substituted derivatives containing not more than a total of 12 carbon atoms in the nuclear-substituted groups, said copolymerizable compound containing not more than a total of 12 carbon atoms in the hydrocarbon groups attached to the nitrogen atom, said copolymer having been prepared using 0.25–8 parts per 100 by weight of total monomeric material.

21 Claims, No Drawings

INCREASING VISCOSITY OF NORMALLY LIQUID HYDROCARBONS AND GELS PRODUCED

This invention relates to increasing of the viscosity of hydrocarbons and to the products produced. In one aspect the invention provides gels produced by incorporating into a normally liquid hydrocarbon, a liquid hydrocarbon dispersible rubbery or solid copolymer of a basic group-containing, copolymerizable monomer of the tertiary amine type and at least one of a monomer selected from a conjugated diene, an acrylate and a methacrylate. In another of its aspects the invention relates to the products obtained by proceeding as described, the products being useful as fire bomb or flame thrower ingredients, when prepared from gasoline or gasoline-type hydrocarbons and as additives to improve the viscosity characteristics of lubricating oils and greases when prepared from a hydrocarbon or hydrocarbons which are ordinarily useful in such lubricants. The gels produced are highly cohesive, stable in storage and, in general, shear-stress thinning in nature, i.e., they will become thinner when mechanically worked, as when stirred or shaken, and will thicken when the working stress is removed.

An object of the invention is to prepare a gel from a normally liquid hydrocarbon. Another object of the invention is to prepare from normally liquid hydrocarbons gels which vary from a thin, pourable type to a shape-retaining type. Another object of the invention is the preparation of a product suitable for use in an incendiary bomb or in a flame thrower device. A further object of the invention is the preparation of an improved lubricant such as an oil or a grease.

Other aspects, objects, as well as advantages of the invention are apparent from a study of this disclosure and its appended claims.

According to the present invention products herein set forth are prepared by incorporating into a normally liquid hydrocarbon, such as a gasoline type hydrocarbon or a lubricating oil type hydrocarbon, at least one of a rubbery and solid liquid hydrocarbon dispersible, copolymer of a basic group-containing, copolymerizable monomer of the tertiary amine type and a compound represented by the formula

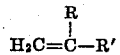

wherein R is selected from the group consisting of hydrogen, alkyl and alkoxy; and R' is selected from the group consisting of

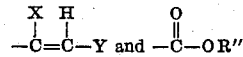

wherein X is selected from the group consisting of hydrogen, alkyl and a halogen, Y is selected from the group consisting of hydrogen, alkyl and aryl; wherein R'' is selected from the group consisting of alkyl, cycloalkyl, aryl, alkaryl and aralkyl; the total of the carbon atoms in R and R' when R' does not contain R'' is two to eight; and wherein when R'' is present the total of the carbon atoms in R and R' is two to 13.

Thus, it will be seen that the invention in at least one of its broad aspects involves the production of gels as herein described and exemplified by incorporating into a normally liquid hydrocarbon a copolymer which is rubbery or solid, is dispersible in a liquid hydrocarbon and is produced by copolymerizing at least one of a conjugated diene compound, an acrylate and a methacrylate with a copolymerizable compound containing a basic group of the tertiary amine type. While there are given herein certain specific limits relating to the number of carbon atoms in a given molecule, it will be understood that such limitations are those now preferred. Further, the invention having been set forth and exemplified, one skilled in the art having studied this disclosure and claims will be able to select compounds and/or limits in each case which may be somewhat different from those now preferred, it being clear the essence of the invention is in the discovery that copolymers of the kind herein set forth and described herein have the property of producing gels when compounded with liquid hydrocarbons also as set forth and described herein.

Polymeric materials which are applicable are copolymers of conjugated dienes, acrylates or methacrylates with basic monomers. Conjugated dienes used are generally those which contain from four to ten, inclusive, carbon atoms per molecule and include 1,3-butadiene, isoprene, chloroprene, piperylene, 2,3-dimethyl-1,3-butadiene, 1-phenylbutadiene, 2,3-dimethyl-1,3-hexadiene and 2-methoxy-1,3-butadiene. Acrylates and methacrylates include methyl acrylate, methyl methacrylate, and the corresponding ethyl, n-propyl, isopropyl, butyl, phenyl, lauryl, octyl, cyclohexyl, benzyl, tolyl and the like acrylates and methacrylates. Of these monomers which are applicable, conjugated dienes and particularly butadiene are now preferred.

Basic monomers which are applicable are those of the tertiary amine type. Thus, as long as a monomer of this type has been used in the preparation of the polymer which is incorporated into the liquid hydrocarbon, the resulting polymer will produce a gel. Of these compounds those which are now most preferred are pyridine and quinoline derivatives, especially the pyridine derivatives, containing a

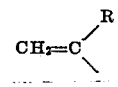

substituent in which R is selected from the group of hydrogen and methyl, i.e., the substituent is a vinyl or alpha-methylvinyl (isopropenyl) group. Various alkyl-substituted vinylpyridine and vinylquinoline derivatives are also applicable, but it is generally preferred that the total number of carbon atoms in the nuclear-substituted, or nuclear contained, groups should not be greater than twelve and more frequently these alkyl groups are methyl and/or ethyl. Examples of such compounds are 2-vinylpyridine, 2-methyl-5-vinylpyridine, 2-vinyl-5-ethylpyridine, 4-vinylpyridine, 3-vinylpyridine, 5-methyl-2-vinylpyridine, 2,3,4-trimethyl-5-vinylpyridine, 4-methyl-3-vinylpyridine, 3-ethyl-5-vinylpyridine, 2,6-diethyl-4-vinylpyridine, 2-isopropenylpyridine, 2-vinylquinoline, 2,-vinyl-4-ethylquinoline, 8-ethyl-2-vinylquinoline, 6,7-dimethyl-3-vinylquinoline, 4-methyl-2-vinylquinoline, 3-vinylquinoline, 1,6-dimethyl-3-vinylisoquinoline, 3-vinylisoquinoline, and 4-propyl-2-vinylquinoline. Other polymerizable compounds which contain basic nitrogen groups and which may also be employed include dialkylaminostyrenes such as N,N-dimethylaminostyrene, N,N-diethylaminostyrene, N-methyl-N-ethylaminostyrene, N,N-dipropylaminostyrene and the corresponding dialkylamino-alpha-methylstyrenes; dialkylaminoethyl acrylates such as N,N-dimethylaminoethyl acrylate, N,N-diethylaminoethyl acrylate, N-methyl-N-ethylaminoethyl acrylate, etc., and the corresponding dialkylaminoethyl methacrylates. Other basic monomers such as N-methyl-2-vinylpyrrole, N-ethyl-2-vinylmorpholine, vinylpyrazine, and 1,4-dimethyl-2-vinylpiperazine can also be used. The total number of carbon atoms in the groups attached to the nitrogen atom, in general, will not be in excess of twelve in the tertiary amines used in the invention.

It is understood that mixtures of conjugated dienes, mixtures of conjugated dienes with acrylates or methacrylates, or mixtures of acrylates or methacrylates can be employed with one or more basic monomers. The copolymers now preferred are butadiene/2-vinylpyridine and butadiene/2-methyl-5-vinylpyridine copolymers.

Good results are obtained when the polymers which are used according to this invention are prepared from a minor proportion of the basic group-containing monomer and a major proportion of the monomer copolymerized therewith. Presently the minor constituent of the monomeric material mixture, before polymerization, will be present usually in an amount in the range 0.25 and 8 parts per 100 by weight of total monomeric material.

The preparation of the copolymers which are used in the invention can be effected as described in the examples, that is by emulsion polymerization techniques which are known in the art. However, it is to be understood that the invention is not limited to this technique as long as the copolymers are substantially of the same character or properties as those produced by this technique.

The normally liquid hydrocarbons which are gelled according to the invention include pentanes, hexanes, heptanes, octanes, cyclohexane, methylcyclohexane, benzene, toluene, xylene, and various mixtures of aliphatic and/or aromatic hydrocarbons such as petroleum naphthas, gasoline, kerosene, jet fuel, aviation fuel, and lubricating oils.

As noted, the copolymers used are rubbery or solid materials. It is necessary that they be of the type that are readily dispersible in gasoline to form homogeneous compositions. When an intimate dispersion is obtained, the resulting product is a gel. When preparing gels in accordance with the process of this invention, the requisite amount of copolymer is admixed with the hydrocarbon liquid and the materials are blended, under existing conditions of temperature and pressure, or at a different temperature and/or pressure if loss of vapors in the case of a low-boiling hydrocarbon is to be avoided or easier mixing in the case of a higher-boiling hydrocarbon is to be obtained, by any means such as stirring, shaking, or passing the mixture through a homogenizer to produce a homogeneous composition. If the gels are prepared by stirring or shaking, generally from 10 to 20 hours is sufficient to produce an intimate blend of the polymer in gasoline. On the other hand, two or three passes through a homogenizer will usually be sufficient for the production of a homogeneous composition. Regardless of the method of blending, gels are produced as a result of obtaining an intimate dispersion of the polymer in gasoline. For blending a lubricating oil a correspondingly increased effort will be required to prepare the gel or blend.

Gels are obtained from gasoline by blending therewith copolymers containing a major proportion of a conjugated diene, an acrylate or a methacrylate, and a minor proportion of a basic monomer, e.g., a vinylpyridine, vinylquinoline, or other polymerizable material containing a basic group, as herein described. These gels are, in general, highly cohesive and shear-stress thinning in nature. Lubricating oils can be processed in a similar manner by the incorporation of polymers of the type described to produce lubricating oils having a higher viscosity and also to produce greases.

The gelling properties of a copolymer are governed by the amount of basic monomer employed in the production of the copolymer. As the amount of basic monomer is decreased, larger quantities of the copolymer are required to produce gels. When copolymers are prepared using the monomer ratios hereinbefore disclosed, the quantity of copolymer added to a normally liquid hydrocarbon, in accordance with the process of this invention, will vary in amounts in the range between 5 and 18 parts by weight per 100 parts by weight of the normally liquid hydrocarbon.

It will be obvious to one skilled in the art, having studied this disclosure, that the viscosities of the gels produced can be varied by varying the types of materials employed in the production of the copolymer and also by varying the monomer ratio within the limits already stated. Viscosity of the gels also can be varied depending upon the amount of polymer employed in a given amount of gasoline or other hydrocarbon liquid. The gels generally become stiffer with increasing amounts of copolymer.

Also, according to the invention and as an especially important feature thereof the viscosities of the solutions or dispersions of the polymers in the hydrocarbons can be changed, especially increased, through the use of additives which will either react with the basic groups in the polymer, i.e., undergo salt formation, or which are capable of forming complexes or undergoing hydrogen bonding with the basic groups in the polymer. Additives of the first type include inorganic acids such as hydrochloric, sulfuric and phosphoric acids; monobasic organic acids such as acetic, propionic, butyric and valeric acids; and dibasic organic acids such as oxalic, malonic, succinic, adipic, azelaic, citric and maleic acids. Ammonium hydroxide is an additive of the second type. The amount of additive employed will generally not exceed 7–10 parts by weight per 100 parts of copolymer and generally not more than 5 parts by weight is used. To the extent that the additive is used it will in proportion affect the viscosity. Therefore, no lower limit is apparent.

There is generally an increase in the viscosity of the normally liquid hydrocarbon-polymer composition when an additive is employed. It is possible to prepare a gel of the viscosity desired through the proper choice of polymer, through the use of additives, and by regulating the proportions of polymer and gasoline or lubricating oil in the composition. Thus, whenever a particular copolymer in a desired amount does not yield a desired increase in viscosity of the gel an additive can be used to obtain the desired viscosity. It should be noted, however, that the additive must not be used in such amounts that it will cause precipitation when it is incorporated into the hydrocarbon-polymer composition.

When an additive is employed, a smaller amount of polymer is required to produce a gel than when the polymer alone is used. Amounts of polymer can range as low as 2.5 parts by weight per 100 parts by weight of the normally liquid hydrocarbon, and will generally not exceed 18 parts by weight per 100 parts by weight of the normally liquid hydrocarbon.

Especially noted are the desirable products of the examples, e.g., those prepared by blending gasoline hydrocarbons with the following copolymers: 95/5 and 98/2 butadiene/2-methyl-5-vinylpyridine copolymers in amounts of from 6.8–13.7 parts by weight per 100 parts by weight of gasoline when a polymer alone is used; 95/5 butadiene/2-methyl-5-vinylpyridine in amounts of from 2.7–13.7 parts by weight per 100 parts by weight of gasoline when phosphoric acid is present; and 99.5/0.5 and 99/1 copolymers when 6.8 parts by weight per 100 parts by weight of gasoline is employed in the presence of phosphoric acid.

While there have been set forth various alternative compounds which can be used in the preparation of the copolymers which in turn are used to prepare the gels of the invention, it is noted that the said alternatives are not necessarily equivalents and are, therefore, not to be treated as such simply because they are set forth as functional alternatives useful according to the invention.

It is especially noteworthy, as illustrated by the examples, that polybutadiene rubber, per se, does not act to alter the hydrocarbon liquids as do the copolymers of the invention.

The minimum amount of copolymer required to produce a gel is dependent not only upon the amount of basic monomer employed in its preparation but also upon the type of comonomer as well as upon the normally liquid hydrocarbon being gelled. The ranges given are not necessarily applicable to all the polymers with all the hydrocarbons. Gels can be obtained, however, with the proper combination of copolymer and hydrocarbon in the ranges given. Example IX shows that toluene is not gelled with the amount of ethyl acrylate/MVP copolymer used unless concentrated ammonium hydroxide is added, while in Example I the amount of 95/5 butadiene/MVP copolymer required for gelling a gasoline is somewhere in the range between 2.9 and 7.4 grams per 100 grams of gasoline. Example VII uses a different fuel and a 95/5 butadiene/MVP copolymer and gelling occurs when the amount of copolymer present is between 2.7 and 6.8 grams per 100 grams of gasoline. Example V shows different polymers with different fuels. The grams of polymer per 100 grams of fuel is as follows:

| Regular motor fuel | 6.8 |
| Jet fuel | 6.6 |
| Aviation fuel | 7.0 |

The 99.5/0.5 and 99/1 copolymers do not produce gels unless phosphoric acid is present but a gel is formed with the 95/5 copolymer.

EXAMPLE I

Two butadiene/2-methyl-5-vinylpyridine rubbery copolymers and a 27 Mooney (ML-4) polybutadiene were prepared by emulsion polymerization in accordance with the following recipes:

|  | Parts by Weight | | |
|---|---|---|---|
|  | 1 | 2 | 3 |
| 2-Methyl-5-vinylpyridine | 2 | 5 | – |
| Butadiene | 98 | 95 | 100.00 |
| Water | 180 | 180 | 180.00 |
| Sodium fatty acid soap | 5 | 5 | – |
| Potassium rosin soap[1] | – | – | 4.50 |
| $K_2S_2O_8$ | 0.3 | 0.3 | – |
| n-Dodecyl mercaptan | 0.6 | 0.6 | – |
| tert-Dodecyl mercaptan | – | – | 0.65 |
| Diisopropylbenzene hydroperoxide | – | – | 0.10 |
| Sodium formaldehyde sulfoxylate | – | – | 0.10 |
| $FeSO_4 \cdot 7H_2O$ | – | – | 0.02 |
| Versene[2] | – | – | 0.50 |
| KCL | – | – | 0.85 |
| Reaction temperature, F | 122 | 122 | 41.00 |
| Reaction time, hours | 16 | 16 | 9.50 |
| Conversion, percent | 83 | 90 | 60.00 |

1. Dresinate 214
2. Tetra sodium salt of ethylene diamine tetraacetic acid

Different amounts of each of these copolymers were blended on a mechanical shaker with 100 ml (68 grams) of 60 octane gasoline (blend of isooctane and n-heptane) to produce homogeneous compositions. The mixtures were shaken for approximately 16 hours. The runs with polybutadiene were made as controls. As shown in the following table, the compositions containing 5 and 8 grams, respectively, of each of the butadiene/2-methyl-5-vinylpyridine copolymers were gels while no gel formed when lesser amounts of polymers were used. The polybutadiene failed to give appreciable thickening. Viscosities made with a Brookfield viscosimeter are shown in the following table.

| Copolymer butadiene/MVP[1] | Polymer. grams | Grams polymer/ 100 grams gasoline | Viscosity (centipoises) | | | |
|---|---|---|---|---|---|---|
|  |  |  | 6 r.p.m. | 12 r.p.m. | 30 r.p.m. | 60 r.p.m. |
| 95/5 | 1 | 1.5 | No gel formed | | | |
| 95/5 | 2 | 2.9 | No gel formed | | | |
| 95/5 | 5 | 7.4 | 2,500 | 1,670 | 1,115 | 840 |
| 95/5 | 8 | 11.8 | [3] 100,000+ | | | |
| 98/2 | 5 | 7.4 | 3,200 | 2,500 | 1,920 | 1,500 |
| 98/2 | 8 | 11.8 | 43,500 | >50,000 | | |
| 100/0[2] | 5 | 7.4 | 75 | 50 | 35 | 30 |
| 100/0[2] | 8 | 11.8 | 300 | 300 | 295 | 285 |

[1] 2-methyl-5-vinylpyridine.
[2] Polybutadiene.
[3] Above range of Brookfield viscometer.

The gelled compositions containing the butadiene/2-methyl-5-vinyl-pyridine copolymers were stable after being test-aged for 1 year.

EXAMPLE II

Three identical blends were prepared from the 98/2 butadiene/2-methyl-5-vinylpyridine copolymer described in Example I and 60 octane gasoline using 5 grams of the copolymer per 100 ml (68 grams) of the gasoline. In each case the mixture was shaken in a mechanical shaker for approximately 16 hours. Gels were formed in all cases. One composition was reserved as a control. To one blend 0.23 grams of concentrated ammonium hydroxide was added and to the other 0.25 gram of concentrated phosphoric acid (85 weight per cent) was added. The materials were blended by stirring to give homogeneous compositions. The gels were test-aged for one year and remained stable. Results of Brookfield viscometer determinations before and after aging are shown below.

|  | No Additive | $NH_4OH$ | $H_3PO_4$ |
|---|---|---|---|
| Viscosity (centipoises), before aging | | | |
| 6 rpm | 3,200 | 2,600 | 2,500 |
| 12 rpm | 2,500 | 2,050 | 15,000 |
| 30 rpm | 1,920 | 1,400 | 6,140 |
| 60 rpm | 1,500 | 1,000 | 4,250 |
| Viscosity (centipoises), after aging | | | |
| 6 rpm | 5,600 | >100,000[1] | 10,000 |
| 12 rpm | 5,300 | – | 4,000 |
| 30 rpm | 3,200 | – | 2,000 |
| 60 rpm | 4,500 | – | 1,000 |

1. Above range of Brookfield viscometer

The gel formed in the composition containing ammonium hydroxide was less viscous before aging than the composition containing no additive but was much more viscous after aging. The gel formed in the composition containing phosphoric acid was more viscous before and after aging than the composition containing no additive but with more rapid stirring the viscosity showed a rapid decrease. However, after stirring ceased, the gel became thick again.

EXAMPLE III

Two blends of a 95/5 butadiene/2-methyl-5-vinylpyridine copolymer described in Example I and 60 octane gasoline were prepared using 5 grams of the copolymer per 100 ml (68 grams) of the gasoline. In each case the mixture was shaken in a mechanical shaker for approximately 16 hours. Gels were formed. To one composition 0.23 gram of concentrated ammonium hydroxide was added and the mixture was stirred to obtain a homogeneous blend. The other composition was reserved as a control. The gels were test-aged for one year and remained stable. Result of Brookfield viscometer determinations before and after aging are shown below.

|  | No Additive | $NH_4OH$ |
|---|---|---|
| Viscosity (centipoises), before aging | | |
| 6 rpm | 2,500 | 6,000 |
| 12 rpm | 1,670 | 4,020 |
| 30 rpm | 1,115 | 2,460 |
| 60 rpm | 840 | 1,760 |
| Viscosity (centipoises), after aging | | |
| 6 rpm | 13,000 | 46,000 |
| 12 rpm | 14,000 | >100,000[1] |
| 30 rpm | 7,600 | – |
| 60 rpm | 5,000 | – |

1. Above range of Brookfield viscometer

EXAMPLE IV

Two gels were prepared by blending a 95/5 butadiene/2-methyl-5-vinylpyridine copolymer with 60 octane gasoline in the manner described in Example III. The copolymer was the same as that of Example I. To one gel 0.25 gram of glacial acetic acid was added and to the other 0.25 gram of concentrated phosphoric acid (85 weight per cent) was added. Both compositions were stirred to give homogeneous blends. The viscosities were determined with a Brookfield viscometer and the following results were obtained:

| Viscosity (centipoises) | Acetic Acid | Phosphoric Acid |
|---|---|---|
| 6 rpm | 2,500 | 8700 |
| 12 rpm | 2,000 | 4120 |
| 30 rpm | 1,560 | 1830 |
| 60 rpm | 1,530 | 1160 |

EXAMPLE V

Three rubbery butadiene/2-methyl-5-vinylpyridine copolymers were prepared by emulsion polymerization at 122° F., in accordance with the following recipes:

| | Parts by Weight | | |
|---|---|---|---|
| | 1 | 2 | 3 |
| Water | 180 | 180 | 180.0 |
| Butadiene | 99 | 99.5 | 95.0 |
| 2-Methyl-5-vinylpyridine | 1 | 0.5 | 5.0 |
| Sodium fatty acid soap | 5 | 5 | 5.0 |
| $K_2S_2O_8$ | 0.3 | 0.3 | 0.3 |
| Mercaptan blend[1] | 0.65 | 0.65 | 0.6 |
| Time, hours | 14 | 14 | 12.0 |
| Conversion, percent | 82 | 81.5 | 68.0 |

1. A blend of tertiary $C_{12}$, $C_{13}$ and $C_{14}$ aliphatic mercaptans in a ratio of 3:1:1 parts by weight.

A series of runs was made in which 5 grams of copolymer was blended with 100 ml of a regular motor fuel (73 g.), jet fuel (76 g.), and an aviation fuel (71 g.), and the several mixtures were allowed to stand approximately 16 hours. To each of several of the samples was added a measured amount of phosphoric acid (85 weight per cent), after which the compositions were shaken on a paint mixer for 5 minutes. Viscosities were then determined on a Brookfield viscometer. Data on these runs are shown in the following table:

The viscosity of each fuel is less than 1.

A 90/10 liquid butadiene/2-methyl-5-vinylpyridine copolymer was prepared by emulsion polymerization at 41° F. in accordance with the following recipe:

| | Parts by weight |
|---|---|
| Water | 180 |
| Methanol rinse | 2 |
| Butadiene | 90 |
| 2-Methyl-5-vinylpyridine | 10 |
| Potassium fatty acid soap[1] | 6 |
| KOH | 0.05 |
| KCl | 0.2 |
| Daxad 11[2] | 0.2 |
| $K_4P_2O_7$ | 0.165 |
| $FeSO_4 \cdot 7H_2O$ | 0.139 |
| p-menthane hydroperoxide | 0.095 |
| tert-Dodecyl mercaptan | 10.0 |

1. Potassium Office Synthetic Rubber soap
2. Sodium salt of condensed alkyl aryl sulfonic acid Four runs were made. The time-conversion data are given below:

| Time, hours | Conversion, percent | Weight percent in blend |
|---|---|---|
| 18.3 | 61.3 | 24.8 |
| 27.0 | 62.5 | 22.9 |
| 15.6 | 58.7 | 26.4 |
| 12.2 | 61.6 | 25.9 |

The four polymers were blended in the proportion shown above and the blend used in gelling tests. For these runs 10 grams of liquid copolymer was added to 100 ml of the regular motor fuel and treated with phosphoric acid. The quantity of phosphoric acid was varied from 0.05 to 5.0 grams. No thickening was observed with the smaller amount and only very slight thickening was observed using 5 grams of phosphoric acid. These data demonstrate that the liquid polymers do not produce gels as do the rubbery polymers, even though they are used in larger amounts.

EXAMPLE VI

The 95/5, 99/1, and 95.5/0.5 rubbery butadiene/2-methyl-5-vinyl pyridine copolymers described in Example V were used to study the gelling of a lubricant. A lubricating oil base stock which was used had the following properties:

| | |
|---|---|
| Viscosity index | 100 |
| Saybolt Universal viscosity at 100 F. | 330 seconds |
| Saybolt Universal viscosity at 210 F. | 54.5 seconds |

| BD/MVP copolymer[1] | Fuel | $H_3PO_4$, grams | Viscosity, centipoises | | | | Description of product |
|---|---|---|---|---|---|---|---|
| | | | 6 r.p.m. | 12 r.p.m. | 30 r.p.m. | 60 r.p.m. | |
| 99.5/0.5 | Regular motor fuel | | 240 | 230 | 225 | 220 | Thin solution. |
| 99.5/0.5 | do | 0.1 | 7,000 | 5,600 | 2,900 | 1,960 | Thick, pourable gel. |
| 99/1 | do | | 100 | 100 | 105 | 100 | Thin solution. |
| 99/1 | do | 0.1 | 4,500 | 3,800 | 3,100 | 5,000 | Thick, pourable gel. |
| 95/5 | do | 0.1 | 15,000 | 12,000 | 9,000 | 7,100 | Heavy, pourable gel. |
| 95/5 | Jet fuel | 0.1 | 88,000 | | | | Heavy, slow-pouring gel. |
| 95/5 | Aviation fuel | 0.1 | 47,000 | 36,700 | | | Thick, pourable gel. |

[1] Butandiene/2-methyl-5-vinylpyridine copolymer.

The fuels employed in the above-described compositions had the following properties:

| | Regular Motor fuel | Jet fuel | Aviation fuel |
|---|---|---|---|
| Tetraethyl lead, cc/gal | 1.2 | – | |
| Reid vapor pressure, lbs/sq in, 100° F. | 11.4 | 2.50 | 6.65 |
| API gravity, 60/60 F. | 62.7 | 54.70 | 68.60 |
| ASTM gum, mg/100 cc | 0.5 | | |
| Distillation: | | | |
| Initial boiling point, F. | 95 | 137 | 110 |
| 10%, F. | 119 | 247 | 144 |
| 40%, F. | 191 | 288 | 179 |
| 70%, F. | 210 | 320 | 211 |
| 90%, F. | 287 | 355 | 224 |
| End point, F. | 349 | 402 | 287 |

| | |
|---|---|
| Flash, Cleveland Open Cup, F | 460 |
| Color, N.P.A. | 1¾ |
| API gravity, 60/60 F. | 29.5 |
| Fire, C.O.C., F. | 525 |
| Pour point, F. | +5 |
| Conradson carbon residue, wt. % | 0.02 |

A 42 Mooney (ML-4) polybutadiene was used as a control polymer. The polybutadiene was prepared by emulsion polymerization at 41° F. in accordance with the following recipe:

| | Parts by Weight |
|---|---|
| Butadiene | 100 |
| Water | 180 |
| Dresinate 214[1] | 4.5 |
| KCl | 0.5 |
| KOH | 0.03 |

| | |
|---|---|
| FeSO₄·7H₂O | 0.02 |
| Versene² | 0.04 |
| Sodium formaldehyde sulfoxylate·2H₂O | 0.10 |
| Diisopropylbenzene hydroperoxide | 0.1 |
| tert-Dodecyl mercaptan | 0.85 |

1. Rosin soap, potassium salt
2. Tetrasodium salt of ethylene diamine tetraacetic acid A conversion of 60 per cent was reached in 7.8 hours.

To each of four 100-ml (88 gram) samples of the lubricating oil described above was added 10 grams of the 95/5, 99/1, and 99.5/0.5 butadiene/2-methyl-5-vinylpyridine copolymers and polybutadiene, respectively. The oil-polymer mixtures were heated in 4-ounce jars in an oven at 100° C. for 48 hours, followed by further heating at 200° C. until all the polymer appeared to be dissolved. These mixtures were allowed to stand approximately 16 hours, after which the viscosity of a sample of each was measured on a Brookfield viscometer. To each jar was then added 0.1 gram of 85 per cent phosphoric acid, after which the mixture was stirred and the viscosity again measured. The viscosity was also determined on a sample of the lubricating oil stock. Data on these tests are tabulated below:

| Polymer | H₃PO₄ grams | Viscosity, centipoises | | | |
|---|---|---|---|---|---|
| | | 6 r.p.m. | 12 r.p.m. | 30 r.p.m. | 60 r.p.m. |
| 95/5 BD/MVP ¹ | | 4,500 | 4,700 | 4,800 | 4,800 |
| 99/1 BD/MVP ¹ | | 22,000 | 21,500 | 29,000 | |
| 95.5/0.5 BD/MVP ¹ | | 98,000 | | | |
| Polybutadiene | | 3,000 | 3,000 | 3,000 | 3,000 |
| 95/5 BD/MVP ¹ | 0.1 | 36,000 | 29,000 | 20,000 | |
| 99/1 BD/MVP ¹ | 0.1 | >100,000 | | | |
| 99.5/0.5 BD/MVP ¹ | 0.1 | >100,000 | | | |
| Polybutadiene | 0.1 | 5,000 | 4,500 | 5,000 | 4,900 |
| Lubricating oil stock (control) | | 120 | 120 | 120 | |

¹ Butadiene/2-methyl-5-vinylpyridine.

The products were all gels, those having viscosities >100,000 being very stiff, cohesive materials which held their own shape. The other gels varied in stiffness with the viscosity in a manner similar to those described in the preceding example.

EXAMPLE VII

A 95/5 butadiene/2-methyl-5-vinylpyridine rubbery copolymer was prepared by emulsion polymerization at 122° F. in accordance with the following recipe:

| | Parts by Weight |
|---|---|
| Water | 180 |
| Butadiene | 95 |
| 2-Methyl-5-vinylpyridine | 5 |
| Sodium fatty acid soap | 5 |
| K₂S₂O₈ | 0.3 |
| Mercaptan blend¹ | 0.6 |

1. As in Example V

A conversion of 76 per cent was obtained in 13 hours.

Several runs were made in which variable quantities of the polymer were blended with 100 ml (73 g.) of the regular motor fuel described in Example V. The mixtures were allowed to stand approximately 16 hours. To each of several of the samples was added a measured amount of phosphoric acid (85 weight per cent) after which the compositions were thoroughly blended. Viscosities of all samples were determined on a Brookfield viscometer. Data on these runs are shown in the following table:

These gels are cohesive and are shear-stress thinning in nature.

EXAMPLE VIII

A lubricant grease was prepared in the following manner: 30 grams of the 95/5 butadiene/2-methyl-5-vinylpyridine copolymer described in Example VII was swelled and brought to a paste by the addition of 50 ml of n-hexane. Three hundred ml (264 grams) of the lubricating oil base stock (described in Example VI) was added with stirring. The mixture was placed on a hot plate and heated at 180° C. and stirred for 3 hours. The n-hexane evaporated during this period. It was removed from the hot plate, and when the temperature had decreased to 130° C., 0.2 gram of 85 weight per cent phosphoric acid (pure) was added. The mixture was shaken on a paint mixer for 5 minutes and then allowed to stand for 3 hours. The product was a viscoelastic gel. ASTM penetration was determined and values were as follows:

| | |
|---|---|
| Unworked at 77° F. | 380 |
| Worked, 60 strokes at 77° F. | 370 |

This product corresponds approximately to an NLGI (National Lubricating Grease Institute) Grade 0 grease (ASTM D217-52T).

EXAMPLE IX

A 90/10 ethylacrylate/2-methyl-5-vinylpyridine copolymer was prepared by emulsion polymerization at 122° F. in accordance with the following recipe:

| | Parts by Weight |
|---|---|
| Water | 180 |
| Ethylacrylate | 90 |
| 2-Methyl-5-vinylpyridine | 10 |
| Sodium fatty acid soap | 5 |
| K₂S₂O₈ | 0.3 |
| NaHSO₃ | 0.5 |
| Mercaptan blend¹ | 0.1 |

1. As in Example V

A conversion of 95 per cent was reached in 15 hours.

Two 4-ounce jars were each charged with 10 grams of the 90/10 ethylacrylate/2-methyl-5-vinylpyridine copolymer and 100 ml (86 grams) of toluene. The polymer dissolved after shaking for 1 hour. One sample was reserved as a control. To the other sample 0.28 gram of concentrated ammonium hydroxide was added and the mixture was shaken for 5 minutes. The product was a thick gel having a consistency similar to vaseline. It was shear-stress thinning in nature. The control sample was not gelled. It remained as a thin solution.

| Grams polymer per: | | | Viscosity, centipoises | | | | |
|---|---|---|---|---|---|---|---|
| 100 ml. gasoline | 100 grams gasoline | Grams H₃PO₄ | 6 r.p.m. | 12 r.p.m. | 30 r.p.m. | 60 r.p.m. | Description of product |
| 2 | 2.7 | 0.1 | 3,700 | 3,070 | 1,700 | 1,025 | Soft, cohesive, pourable gel. |
| 2 | 2.7 | | 18 | 16 | 16 | 17 | Thin solution. |
| 5 | 6.8 | 0.1 | >100,000 | | | | Stiff, cohesive gel; holds its own shape. |
| 5 | 6.8 | | 3,400 | 4,000 | 2,700 | | Thin visco-elastic gel; could be poured. |
| 10 | 13.7 | 0.1 | >100,000 | | | | Very stiff, cohesive gel; holds own shape. |
| 10 | 13.7 | | 38,000 | 28,500 | 17,500 | | Thick, pourable gel. |

The materials were allowed to stand approximately 60 hours and viscosities were then measured on a Brookfield viscometer. Results were as follows:

| Sample No. | Viscosity, Centipoises | | | |
|---|---|---|---|---|
| | 6 rpm | 12 rpm | 30 rpm | 40 rpm |
| 1 (control) | 150 | 150 | 165 | 160 |
| 2 | 13,000 | 11,800 | 7,400 | 3,900 |

The Brookfield viscometer to which reference is made herein is that which has been described by the Brookfield Engineering Laboratories, Inc., of Stoughton, Massachusetts.

Reasonable variation and modification are possible within the scope of the foregoing disclosure and the appended claims to the invention the essence of which is that copolymers, as described, have been found to gel or otherwise to improve the characteristics of liquid hydrocarbons and that such gels can be modified by the incorporation of additives, also as described.

I claim:

1. The production of a gel which comprises incorporating into a normally liquid hydrocarbon a small proportion effective to form a gel of at least one liquid hydrocarbon dispersible copolymer selected from the group consisting of rubbery and solid copolymers of a compound represented by the formula

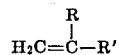

wherein R is selected from the group consisting of hydrogen, alkyl and alkoxy; and R' is selected from the group consisting of

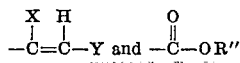

wherein X is selected from the group consisting of hydrogen, alkyl and a halogen, Y is selected from the group consisting of hydrogen, alkyl and aryl; wherein R'' is selected from the group consisting of alkyl, cycloalkyl, aryl, alkaryl, and aralkyl; the total of the carbon atoms in R and R' when R' does not contain R'' is two to eight; and wherein when R'' is present the total of the carbon atoms in R and R' is two to thirteen and a copolymerizable compound containing a basic tertiary amine group selected from the group consisting of vinyl pyridines, vinylquinolines and their nuclear-alkyl-substituted derivatives containing not more than a total of 12 carbon atoms in the nuclear-substituted groups, said copolymerizable compound containing not more than a total of 12 carbon atoms in the hydrocarbon groups attached to the nitrogen atom, said copolymer having been prepared using 0.25-8 parts per 100 by weight of total monomeric material.

2. The production of a gel according to claim 1 wherein 1,3-butadiene and 2-methyl-5-vinylpyridine are used to prepare the copolymer and wherein the normally liquid hydrocarbon is gasoline.

3. The production of a gel according to claim 1 wherein ethyl acrylate and 2-methyl-5-vinylpyridine are used to prepare the copolymer and the normally liquid hydrocarbon is gasoline.

4. The production of a gel according to claim 1 wherein 1,3-butadiene and 2-vinylpyridine are used to prepare the copolymer and the normally liquid hydrocarbon is gasoline.

5. The production of a gel according to claim 1 wherein ethyl acrylate and 2-vinylpyridine are used to prepare the copolymer and the normally liquid hydrocarbon is gasoline.

6. The production of a gel according to claim 1 wherein methyl methacrylate and 2-methyl-5-vinylpyridine are used to prepare the copolymer and the normally liquid hydrocarbon is gasoline.

7. A gel consisting essentially of a normally liquid hydrocarbon selected from the group consisting of a gasoline hydrocarbon, a lubricating oil hydrocarbon and mixtures thereof having dispersed therein a small proportion effective to form a gel of at least one of a rubbery and solid, liquid hydrocarbon dispersible, copolymer of a basic group-containing, copolymerizable monomer having a tertiary amine group selected from the group consisting of vinylpyridines, vinylquinolines and their nuclear alkyl-substituted derivatives containing not more than a total of 12 carbon atoms in the nuclear alkyl-substituted groups, said copolymerizable compound containing not more than a total of 12 carbon atoms in the hydrocarbon groups attached to the nitrogen atom, said copolymer having been prepared using 0.25-8 parts per 100 by weight of total monomeric material and a compound represented by the formula

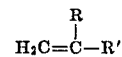

wherein R is selected from the group consisting of hydrogen, alkyl and alkoxy; and R' is selected from the group consisting of

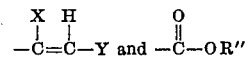

wherein x is selected from the group consisting of hydrogen, alkyl and a halogen, Y is selected from the group consisting of hydrogen, alkyl and aryl; wherein R'' is selected from the group consisting of alkyl, cycloalkyl, aryl, alkaryl and aralkyl; the total of the carbon atoms in R and R' when R' does not contain R'' is two to eight and wherein when R'' is present the total of the carbon atoms in R and R' is two to 13.

8. A gel according to claim 7 wherein from 5 to 18 parts by weight of copolymer per hundred parts by weight of the hydrocarbon are present in the gel.

9. A gel consisting essentially of a blend of a normally liquid hydrocarbon and from approximately 2.5 to approximately 18 parts by weight thereof of a copolymer selected from the rubber and solid copolymers of butadiene and a vinylpyridine, the said copolymer containing the said monomers in a proportion obtained by copolymerization in the approximate range of 0.25-8 parts by weight of the vinylpyridine per 100 parts of the total monomers.

10. A method of producing a gel from a normally liquid hydrocarbon which comprises incorporating into said hydrocarbon a small proportion effective to form a gel of a hydrocarbon dispersible copolymer selected from the group consisting of the rubbery and solid copolymers of a vinyl-substituted pyridine containing not in excess of 12 carbon atoms to the molecule and a conjugated diene containing not more than 10 carbon atoms to the molecule, effective to produce said gel, said copolymer having been prepared employing a proportion of the said vinyl-substituted pyridine to the said conjugated diene of approximately 0.25 to 8 parts by weight per 100 parts of the monomers which are copolymerized.

11. A method of producing a gel from a normally liquid hydrocarbon which comprises incorporating into said hydrocarbon a small proportion of a copolymer of a vinyl-substituted quinoline containing not more than 12 carbon atoms to the molecule and a conjugated diene containing not more than 10 carbon atoms to the molecule, said copolymer having been prepared employing a proportion of the said vinyl-substituted quinoline to the said conjugated diene of approximately 0.25 to 8 parts by weight per 100 parts of the monomers which are copolymerized.

12. A lubricant having improved properties consisting essentially of a lubricant having incorporated therein a small proportion effective to form a gel of a copolymer selected from the group consisting of rubbery and solid copolymers of a compound represented by the formula

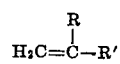

wherein R is selected from the group consisting of hydrogen, alkyl and alkoxy; and R' is selected from the group consisting of

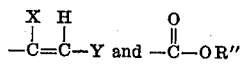

wherein X is selected from the group consisting of hydrogen, alkyl and a halogen, Y is selected from the group consisting of hydrogen, alkyl and aryl; wherein R" is selected from the group consisting of alkyl, cycloalkyl, aryl, alkaryl and aralkyl; the total of the carbon atoms in R and R' when R' does not contain R" is two to eight; and wherein when R" is present the total of the carbon atoms in R and R' is two to 13 and a copolymerizable compound containing a basic tertiary amine group selected from the group consisting of vinylpyridines, vinylquinolines and their nuclear alkyl-substituted derivatives containing not more than a total of 12 carbon atoms in the nuclear alkyl-substituted groups, said copolymerizable compound containing not more than a total of 12 carbon atoms in the hydrocarbon groups attached to the nitrogen atom said copolymer having been prepared using 0.25–8 parts per 100 by weight of total monomeric material.

13. A method of gelling a gasoline which comprises blending the same with a small proportion effective to form a gel of a butadiene/2-methyl-5-vinylpyridine rubber copolymer, prepared from the monomers in an approximate ratio of about 95–98 parts of butadiene to about 5–2 parts of the 2-methyl-5-vinylpyridine.

14. A gel according to claim 21 wherein the said copolymer is present in a proportion of about 6.8–13.7 parts by weight of the copolymer per hundred parts by weight of gasoline.

15. A gel consisting essentially of a normally liquid hydrocarbon having dispersed therein a small proportion effective to form a gel of at least one liquid hydrocarbon dispersible copolymer selected from the group consisting of rubbery and solid copolymers of a compound represented by the formula

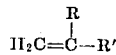

wherein R is selected from the group consisting of hydrogen, alkyl and alkoxy; and R' is selected from the group consisting of

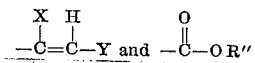

wherein X is selected from the group consisting of hydrogen, alkyl and a halogen, Y is selected from the group consisting of hydrogen, alkyl and aryl; wherein R" is selected from the group consisting of alkyl, cycloalkyl, aryl, alkayl and aralkyl; the total of the carbon atoms in R and R' when R' does not contain R" is two to eight; and wherein when R" is present the total of the carbon atoms in R and R' is two to 13 and a copolymerizable compound containing a basic tertiary amine group selected from the group consisting of vinylpyridines, vinylquinolines and their nuclear alkyl-substituted derivatives containing not more than a total of 12 carbon atoms in the nuclear alkyl-substituted groups, said copolymerizable compound containing not more than a total of 12 carbon atoms in the hydrocarbon groups attached to the nitrogen atom, said copolymer having been prepared using 0.25–8 parts per 100 by weight of total monomeric material.

16. A production of a gel according to claim 1 wherein there is also used a modifying additive in an amount not exceeding 10 parts per 100 of copolymer, which is capable of undergoing chemical combination with basic groups in the polymer and which is selected from the group consisting of mineral acids, lower monobasic alkanoic acids, lower dibasic alkanoic acids, lower dibasic alkenoic acids, citric acid and ammonium hydroxide.

17. A production of a gel according to claim 16 wherein the additive is phosphoric acid.

18. A production of a gel according to claim 16 wherein the additive is acetic acid.

19. A production of a gel according to claim 16 wherein the additive is ammonium hydroxide.

20. A production of a gel according to claim 16 wherein the additive is hydrochloric acid.

21. A production of a gel according to claim 16 wherein the additive is sulfuric acid.

* * * * *